United States Patent [19]

Cocca

[11] Patent Number: 5,315,342

[45] Date of Patent: May 24, 1994

[54] AUTOMATIC FOCUS AND INDIRECT ILLUMINATION CAMERA SYSTEM

[75] Inventor: J. David Cocca, Pittsford, N.Y.

[73] Assignee: Eastman Kodak Company, Rochester, N.Y.

[21] Appl. No.: 996,997

[22] Filed: Dec. 28, 1992

[51] Int. Cl.$^5$ .................... G03B 13/36; G03B 15/05
[52] U.S. Cl. ............................ 354/403; 354/132; 354/149.1
[58] Field of Search ............... 354/403, 132, 149.1

[56] References Cited

U.S. PATENT DOCUMENTS

| | | | |
|---|---|---|---|
| 4,518,242 | 5/1985 | Toyama | 354/403 |
| 4,592,638 | 6/1986 | Kaneda et al. | 354/403 |
| 4,693,582 | 9/1987 | Kawamura et al. | 354/403 |
| 4,760,418 | 7/1988 | Ishizaki et al. | 354/403 |
| 4,818,865 | 4/1989 | Matsui et al. | 250/201 |
| 4,835,561 | 5/1989 | Matsui | 354/403 |
| 4,843,227 | 7/1989 | Matsui et al. | 250/201 |
| 4,992,817 | 2/1991 | Aoyama et al. | 354/403 |
| 5,049,916 | 9/1991 | O'Such et al. | 354/412 |
| 5,136,312 | 8/1992 | Weaver et al. | 354/132 |

*Primary Examiner*—W. B. Perkey
*Attorney, Agent, or Firm*—David M. Woods

[57] ABSTRACT

An automatic focus and indirect illumination control system for focusing a camera imaging lens on a scene and for selectively illuminating the scene with light from a camera associated light source wherein the camera includes active and passive scene range finders for automatic focus control of the imaging lens, an active bounce surface range finder and direct and indirect illumination lamps operable in relation to the detection of a reflective surface. The active range finders are connected to a common drive circuit and auto ranging circuit and are operated selectively by the camera microcontroller in conjunction with a scene illumination photometric sensor. A passive multi-spot scene range finder is operated in conjunction with the active single-spot scene range finder for automatic focus control based on left, central and right subject distance information under normal scene illumination conditions and central subject distance information under low scene illumination, respectively.

13 Claims, 4 Drawing Sheets

AUTOMATIC FOCUS AND INDIRECT ILLUMINATION CAMERA SYSTEM

FIELD OF THE INVENTION

The present invention relates to automatic exposure (AE), automatic focus (AF), and automatic illumination apparatus for cameras and, more particularly, to active and passive range finding systems for providing distance related control signals for AE control and for detecting indirect reflecting surfaces for illumination of the scene captured by still cameras, video cameras and the like.

BACKGROUND OF THE INVENTION

Sophisticated, microprocessor based control systems for video cameras, still cameras and cine cameras have been developed together with advances in synchronized direct and indirect scene illumination systems for providing automatic exposure, automatic focus and, in the case of still cameras, automatic strobe flash illumination, mounted on or associated with the camera. The microprocessor based control systems for such cameras store operating algorithms for processing user interface and sensor developed signals and for developing imaging lens focus, image exposure, media (film or videotape) advance and illumination control signals as well as providing data and signals to the user. Such a highly developed automatic camera control system is disclosed in commonly assigned U.S. Pat. No. 5,049,916 to O'-Such et al, incorporated herein by reference in its entirety.

The illumination of objects in a scene that is insufficiently lighted by natural or artificial indoor lighted is typically effected by a camera mounted or associated flood lamp, in the case of video or cine cameras, and the electronic strobe flash systems, in the case of still cameras. Electronic strobe flash systems mounted on or in a camera and involving the rapid discharge of a high voltage through a flash lamp synchronized with the exposure of an image frame are well-known in the photographic art. For indoor illumination of a scene, it is desirable to provide indirect lighting so that it appears to be illuminated from above in a way characteristic of natural lighting and to illuminate the scene directly to soften dark shadows caused by downwardly directed light.

In strobe flash illumination for still cameras, the indirect illumination is commonly known as "bounce" flash, since the light is typically directed upward and bounced off a reflective ceiling and onto the scene, although it is also known to bounce the flash light off a vertical wall or panel to provide side illumination. Flash light aimed directly at the scene is referred to as direct illumination or "fill-in" flash. Where natural illumination from above is available, such as in daylight outdoor scenes, direct or fill-in flash may be employed to soften shadows falling on the subject to be photographed. Conversely, in indoor scenes, where illumination from above is not available or does not possess natural light spectral characteristics, it is desirable to provide indirect illumination by bouncing flash light off a ceiling and onto the scene or subject to be photographed. In such situations, it is also desirable to provide direct illumination so as to again fill in shadows created by the downwardly directed bounce flash illumination. The combination of bounce and fill-in flash illumination minimizes the undesirable effects of direct illumination alone, including harsh shadows, red eye, specular reflections, and high contrast or loss of tonal detail depending on the distance of subjects in the image. Unfortunately, indirect flash illumination requires much more energy than direct illumination due to light intensity loss by absorption and scattering by the ceiling or wall surface.

U.S. Pat. No. 4,242,616 describes a photographic flash apparatus for providing both fill-in and bounce flash illumination provided by a direct illumination flash bulb 17 and an indirect illumination flash bulb 19, which are simultaneously charged from a single battery 20 and a discharge capacitor 23. The high voltage capacitor 23 is discharged simultaneously through the flash tubes 17 and 19 synchronously with the operation of the camera shutter. By configuring the direct and indirect flash tubes differently and choosing appropriate circuit components, bounce flash illumination provided by the indirect flash tube 19 exceeds the fill-in illumination provided by the direct flash bulb 17. The amount of illumination provided is measured by a photo detector aimed at the scene, and both fill-in and bounce flash light is terminated simultaneously when a desired total reflection of light from the scene is achieved. A ratio of indirect to direct illumination of about 75:25 is sought in the operating example of the circuit described in the '616 patent.

U.S. Pat. No. 4,384,238 discloses an electronic strobe flash apparatus for bounce and fill in flash illumination of a scene also having direct and indirect flash tubes coupled in parallel to a charging capacitor, battery, DC/DC converter, and control circuit and to separate quenching circuits for separately halting discharge through each of the flash tubes. In the flash apparatus of the '238 patent, the control circuit is switched into operation synchronously with the camera shutter release and first causes the indirect flash lamp to discharge and emit bounce flash illumination on the scene. During a 40 microsecond period, a photo detector circuit measures the light reflected from the scene and, if the reflected light falls below a certain threshold indicating the absence of a suitable reflective ceiling surface, the bounce flash illumination is quenched and fill-in flash illumination is simultaneously commenced. If, however, the bounce flash illumination reflected from the scene is sufficiently high, then bounce flash illumination continues until the reflected light reaches a second threshold, whereupon bounce flash illumination is quenched and fill-in illumination is commenced. The photo detector and control circuit continues to monitor the accumulated reflected light and quenches fill-in illumination when the total measured illumination reaches a further threshold related to the film %W and shutter speed. The user may override the control circuit by disabling bounce flash illumination when there is sufficient overhead illumination or when no ceiling is present.

A further U.S. Pat. No. 5,136,312 to Weaver et al, assigned to the assignee of the present invention, describes a direct and indirect flash illumination system wherein the presence of a suitable reflective ceiling surface is detected by light reflected therefrom is employed to control the ratio of indirect and direct illumination and, in conjunction with light reflected from the scene, total illumination. In one embodiment, an active radiation emitter transmits IR radiation upward in a manner such that a portion of the radiation is reflected back to a photo detector which provides a first signal containing information relating to the distance between the surface and the flash system as well as the quality of the reflective surface. A control system responsive to the signal causes both bounce and fill-in flash illumination when the indirect reflecting surface is within a predetermined distance and causes operation of only fill-in or direct flash illumination when the indirect reflecting surface is not within the predetermined distance. The first signal and a further signal developed by a photodetector aimed at the scene are employed in controlling total illumination by separately quenching the direct and indirect illumination.

In an alternative embodiment, a photodetector aimed upward is employed in a passive mode to detect bounce flash illumination reflected back from the ceiling, if present, in order to provide the first signal under the circumstances previously described. Thus, the '312 patent discloses a system which determines the presence or absence of a suitable reflective ceiling by measuring light reflected therefrom and controls bounce flash illumination in dependence thereon. Variable flash output and aperture selection can be combined in a single system to match the optical depth of field with the depth of illumination provided by the bounce and/or fill-in flash illumination. A quick recycle mode is also disclosed wherein bounce flash illumination is suppressed. In the various disclosed embodiments, when bounce flash illumination is allowed, it commences simultaneously with fill-in flash illumination, and the illumination from both the direct flash tubes is quenched either simultaneously or in an order dependent on the detected light returning from the scene in accordance with known exposure control algorithms.

In a further U.S. Pat. No. 5,055,865 to Fujino et al, a pair of separately controlled direct and indirect flash apparatus are disclosed which may or may not be incorporated into the camera body wherein bounce and fill-in illumination are provided of a scene under a number of operating algorithms. Preferably, the fill-in illumination is provided by a direct flash lamp, battery, charging circuit and control circuit, all incorporated in the camera body, and bounce illumination is provided by an indirect flash apparatus having a self-contained battery, charging capacitor and micro-computer based control system which may be mounted to hot-shoe of the camera body as if the camera had no internal flash apparatus. The various modes of operation include a charging subroutine illustrated in FIG. 7 where it appears that charging of the external and internal flash apparatus high voltage capacitors is triggered simultaneously and the priority of direct and indirect flash illumination may depend on which capacitor charges up first. The speed of charging the high voltage capacitor of the internal flash apparatus may be affected by prioritized allocation of current drawn from the battery for powering other camera functions, such as automatic focus and motorized film advance as shown in FIG. 17.

In conjunction with direct and indirect illumination systems as described above, sophisticated cameras are also provided with various range finding systems for automatic focus (AF) adjustment of the camera imaging lens. As is well known in the art, the range finders employed in video and still cameras may be characterized as either active or passive. The active AF systems project infrared light or sound electromagnetic radiation from a position on the camera onto an object in the scene to be photographed and detects the reflected portion of the projected electromagnetic radiation. Passive range finders typically rely on ambient scene illumination, although it is known to provide a light emitting diode directed typically toward the center of the scene to augment the available scene illumination.

In AF control systems, the active and/or passive range finders provide signals from which the distance between the camera body and, typically, the subject or structure in the scene that the user has centered the imaging lens on may be determined and employed with a motorized servo-system to adjust the focal length of the imaging lens. Passive range finders employ one or more pairs of linear photo-diode arrays that are positioned end-to-end with respect to one another and a fixed distance apart which forms the baseline of the autoranging triangulation system. In triangulation AF systems, the baseline is a necessary dimension which allows for the formation of similar triangles used to calculate subject distance. Generally, as the baseline dimension and focal length increases and the linear sensor array width (pitch) decreases, the maximum sensing distance increases.

Typically, a pair of focusing lenses are positioned with respect to each pair of spaced apart linear photosensitive arrays to focus the image the camera is pointed at onto the linear arrays. In SLR camera systems, the focusing lenses are arranged symmetrically with respect to the optical axis of the camera's imaging lens and light passing through the lens (Tm) is diverted by half silvered mirrors through the pair of focusing lenses and onto the linear arrays. In range finder cameras, the pair of focusing lenses and the associated linear arrays of photosensitive elements are mounted end-to-end on the camera a distance away from the imaging lens.

The photo-electrically converted signals from the photosensitive elements of the linear arrays of a passive range finder are processed by the microprocessor based AF control algorithm to detect a displacement of the two images focused thereon and to provide an AF control signal to a motor which drives a gear mechanism to adjust the imaging lens focus. The -operation of a typical AF system is described in U.S. Pat. No. 4,643,557 to Ishizald et al (incorporated by reference herein in its entirety) and is referred to in the above incorporated '259 patent.

Active range finders typically include a radiation light beam source for emitting a beam of, for example, infrared radiation through a focusing lens in a direction aligned with the axis of the camera imaging lens and a two-area radiation sensitive element spaced a fixed distance away from the radiation emitting element and also having a focusing lens for focusing the infrared radiation reflected by an object in the scene onto the radiation sensitive element as shown, for example, in U.S. Pat. No. 4,518,242, to Toyama, incorporated herein by reference in its entirety. The focal point of the radiation emitting and detecting lenses are correlated to the focal point of the imaging lens, and, if the imaging lens is not in focus on the object from which the radiation is reflected, the reflected radiation is focused more favorably on one or the other of the two areas of the radiation sensitive element. The imaging lens is driven by a servo motor to change its focus as a function of the positive or negative out of focus deviation detected by the active auto range finding integrated circuit until the reflected radiation is imaged in a null zone between the two active areas of the two-part radiation sensor or is equally focused, in intensity, on both areas. Other tis of active range finders are known particularly for use with multiple lens camera systems, but all share the common components of an electromagnetic radiation emitter and detector and signal processing circuits for providing the servo control signal to drive the lens focal length adjustment motor and may be referred to as "single-spot" active range finders, since the emitted light beam is directed onto and reflected from a spot on the scene, typically the central portion thereof.

The active range finder is able to respond to objects of low brightness or low contrast (such as a blank wall). Additionally, because the signal to noise ratio of its signal becomes higher at shorter object distances, where the depth of field is shallow, the active type range finder generally has a high degree of accuracy. There are very few objects whose distances are impossible to measure with an active-type range finder. However, there are limitations in the ability of active range finders to measure objects of low reflectivity at far away distances because the projected energy of an active range finder radiation source cannot be increased as much as desired. Furthermore, if the active range finder radiation beam falls on a target that absorbs its energy (like the black stripe in a shirt), it may fail to detect the object. Additionally, the amount of electrical energy drawn by the active range finder radiation emitter presents a considerable load on the camera battery powering other camera systems.

Conversely, the passive-type range finder is not limited by object distance or object reflectivity contrast and consumes only a small amount of electrical power. However, it is almost impossible for the passive range finder to measure the distance to dim objects. Even where possible, the measurement may take a long time, e.g., half a second. Accordingly, there is a response gap in measuring distance, especially for moving objects. Moreover, the system algorithms become delayed due to the time necessary to carry out the integration of the measured signal. And, as stated above, passive range finders win fail to detect a low contrast target. As also stated above, it is known to extend the useable light level range of passive range finders by providing an infrared light emitting diode which may be energized at low light levels to illuminate the scene and speed operation of the passive range finder. Such illumination is directed at the center of the scene to illuminate the presumed subject of greatest interest. A passive range finder of the type described with available augmenting illumination is described in U.S. Pat. No. 4,992,817, incorporated herein by reference.

In view of these known complimentary strengths and weaknesses of active and passive range finder systems, cameras have been provided with both active and passive range finder systems used selectively or in combination to provide AE in both video and still cameras. See, for example, the following U.S. patents:

| | |
|---|---|
| 4,518,242 | Toyama |
| 4,592,638 | Kaneda, et al. |
| 4,693,582 | Kawamura, et al. |
| 4,818,865 | Matsui, et al. |
| 4,835,561 | Matsui |
| 4,843,227 | Matsui, et al. |
| 4,992,817 | Aoyama, et al. |

The above listed patents disclose a variety of systems and algorithms for selecting and employing the active and passive range finders under a variety of conditions to take advantages of each range finder.

Referring again to the above-incorporated '916 patent, it sets forth the difficulties inherent in the selection and control of various combinations and alternative types of direct and indirect illumination and the selection of the appropriate lens aperture setting that provides sufficient depth-of-field to properly illuminate and expose the primary and background portions of the scene. In the '916 patent, a "multi-spot" passive range finder is focused on the renter, left and right portions of the scene to derive three sets of distance data from which the closest and most distant objects within the three portions of the scene may be employed to assess the "depth" of the scene. The scene depth data may be employed for both AE and AF control and taken into account in selecting the lens aperture setting when employing each type of illumination.

Multi-spot passive scene range finders are available in the form of multiple, e.g. 2 or 3, linear photosensitive element arrays arranged end-to-end to form a first array assembly which is associated with a first lens for focusing the left, central, and right portions of the scene on each respective array. An identical second array assembly and second lens, formed in the same fashion, is provided so that each respective array is positionally paired with its counterpart in the other array, and output signals Of each photosensitive element of each respective pair of arrays are processed as described above to provide two or three separate sets of AF control signals. As in the single array or "single spot" passive range finders described above, augmenting illumination may be provided, but doing so adds even further complexity since two or three separate light emitters and light directing lens elements may be necessary to illuminate each of the two or three portions of the lens. If a single light emitter is provided, it would be directed at the central portion of the scene so as to make the multi-spot array useable as at least a single spot array when such illumination is used.

The complexity, expense and current consumption of such highly automated cameras dictates the necessity of reducing the number of components and simplifying the operating algorithms wherever possible. The problem inherent in the incorporation of all of these automatic features into a single camera resides in the increased cost, complexity and current consumption.

SUMMARY OF THE INVENTION

It is therefore an object of the present invention to simplify the number of components while maintaining the flexibility of operation and accuracy of a camera employing active and passive range finding and selective artificial illumination of the scene to be captured.

These and other objects of the invention are realized in an automatic focus and indirect illumination control system for focusing a camera imaging lens on a scene and for selectively illuminating the scene with light from a camera associated light source comprising first range finder means, including first electromagnetic radiation emitting means for directing radiation at the scene and first electromagnetic radiation detecting means for detecting electromagnetic radiation reflected from the scene, for providing a distance related first signal in response thereto. Second range finder means, including second electromagnetic radiation emitting means for directing radiation at a surface generally oblique to the plane of the scene onto which scene illuminating light may to be directed and second electromagnetic radiation detecting means for detecting electromagnetic radiation reflected from said generally oblique surface, are provided for developing a distance related second signal in response thereto. Signal processing means selectively process said first and second distance related signals for deriving first and second respective range signals in response thereto and control means operatively coupled to said first and second range finder means and said signal processing means selectively energize said first and second electromagnetic radiation emitting means and selectively couple said signal processing means to said first and second detecting means, respectively.

In a preferred embodiment, the system further comprises means for adjusting the focal length of said camera imaging lens with respect to objects of interest in the scene, and third range finder means, including third electromagnetic radiation detecting means for detecting natural or artificial electromagnetic radiation reflected from objects of interest in the scene, for providing a third range signal indicative of the distance between the camera imaging lens and such objects in the scene. The control means employs the first or the third distance related range signal for controlling the camera lens focus.

In a further aspect of the invention, an automatic focus adjusting system for a camera is provided in which a multi-spot passive range finder is employed selectively with an active single-spot range finder for combined scene range finding. In particular, in this aspect of the invention, the automatic focus adjusting system comprises active range finder means, including first electromagnetic radiation emitting means for directing radiation at a scene and first electromagnetic radiation detecting means for detecting electromagnetic radiation reflected from the scene for providing a first distance signal containing information about the distance between the camera imaging lens and radiation reflecting objects in the scene together with passive range finder means comprising at least a first pair of linear photosensitive element arrays each comprising a first plurality of photosensitive elements and a pair of focusing lens elements for focusing a central portion of the scene onto the photosensitive elements of the first pair of arrays and a second pair of linear photosensitive element arrays each comprising a second plurality of photosensitive elements positioned with respect to said pair of lens elements and said first plurality of photosensitive elements so that said lens elements focus a peripheral portion of the scene onto the photosensitive elements of the second pair of arrays. Range finder selection means are provided for selectively operating said active range finding means under first scene illumination conditions and said passive range finding means under second scene illumination conditions.

In either aspect of the invention, the system preferably also includes means for detecting the level of illumination of a scene and providing an insufficient scene illumination signal on detection of an insufficiently illuminated scene for capturing an image thereof by the camera imaging lens and first triggerable scene illumination means for selectively illuminating the scene with light reflected from said reflective surface. The control means further comprises means responsive to said insufficient scene illumination signal for selectively energizing said second radiation emitting means and selectively coupling said signal processing means to said second radiation detecting means and means responsive to said second distance related range signal for triggering said first triggerable scene illumination means when the second distance related range signal signifies the presence of a reflecting surface at a distance and having reflecting characteristics suitable for reflecting the illuminating light onto objects in the scene.

The illumination system also preferably comprises second triggerable scene illumination means for directly illuminating the scene with light and means responsive to said second distance related control signal for triggering said first and said second triggerable scene illumination means when the second distance related range signal signifies the presence of a reflecting surface at a distance and having reflecting characteristics suitable for reflecting the illuminating light onto objects in the scene. Means responsive to said second distance related range signal are provided for triggering said second triggerable scene illumination means when the second distance related range signal signifies the absence of a reflecting surface at a distance and having reflecting characteristics suitable for reflecting the illuminating light from said first triggerable scene illumination means onto objects in the scene.

Advantageously, the surface detecting active range finder system and the scene active range finder share a common signal processing integrated circuit which is selectively employed with the selected range finder radiation emitter in accordance with a selection algorithm which selects between the active and passive AF range finders and the surface detecting active range finder when the AE system indicates the need for artificial illumination of the scene.

These and other objects, advantages and features of the present invention will become more apparent from the following detailed description of the preferred embodiments thereof.

BRIEF DESCRIPTION OF THE DRAWINGS

In the detailed description of the preferred embodiments of the invention presented below, reference is made to the accompanying drawings, in which.

The drawings are not necessarily to scale.

DETAILED DESCRIPTION OF THE ILLUSTRATED EMBODIMENTS

Figure 1:
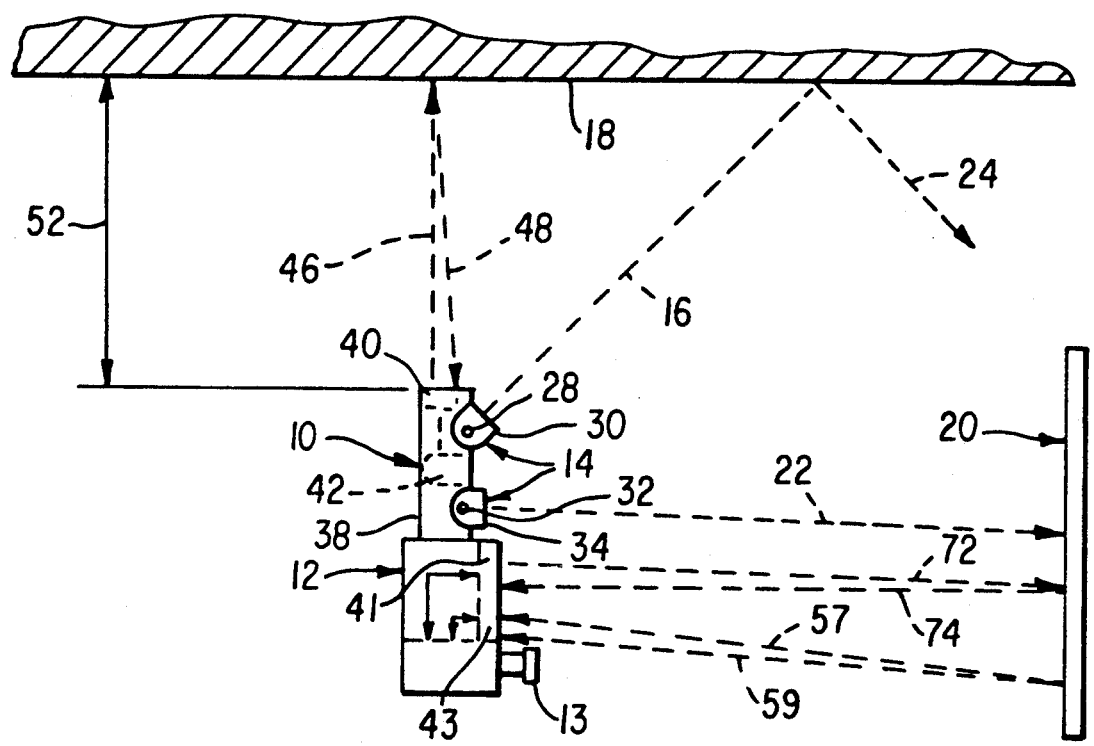
FIG. 1 is a diagrammatic view illustrating a camera and flash illumination system combined with active and passive range finding for AF control and ceiling detection for bounce flash control.

Referring now to FIGS. I and 2, there is shown a camera and flash system, in which the present invention may be implemented. In FIG. 1 the flash system, generally designated 10, provides artificial illumination for image capture and is shown in combination either as an integral or detachable part of a camera 12 having both active and passive range finding components for AF. The system 10 includes sources of flash illumination generally designated 14 which operate selectively in a first mode for projecting light in a first direction 16 toward an indirect reflecting surface 18 to illuminate a subject 20 indirectly and in a second mode for projecting light in a second direction 22 to illuminate the subject 20 directly. Light from flash illumination sources 14 travelling along path 16 is reflected by surface 18 in the direction 24 toward subject 20. Typically, indirect reflecting surface 18 is the ceiling in a room where the subject is being photographed and the first direction 16 is upward.

In the flash system 10 shown in FIG. 1, flash illumination sources 14 comprise separate components for indirect and direct illumination. In particular, a first component includes a flash tube 28 and reflector 30 which are arranged to project a flash light beam toward indirect reflecting surface 18, i.e. upwardly in the arrangement shown in FIG. 1, so that upon refection from the surface 18, the scene or subject 20 can be illuminated indirectly in a way characteristic of the natural lighting of the sun. A second component includes a flash tube 32 and reflector 34 arranged to project a flash fight beam directly at the subject 20 to provide fill-in flash light to soften any dark shadows thereon. The first and second components are mounted on a housing 38 of flash system 10.

In accordance with one embodiment of the present invention, flash system 10 comprises active surface range finder 40, which includes a radiation, e.g. near infrared light, emitter and a photosensitive detector element which detects electromagnetic radiation reflected from indirect reflecting surface 18 and provides a signal containing information about the indirect reflecting surface 18. Control means 42 are provided for controlling the operation of the flash illumination sources 14 in the two modes as determined by the information in the signal from the surface range finder 40. The surface range finder 40 and control means 42 are contained in housing 38, and the surface range finder 40 is angled upward so as to emit radiation from the emitter along a path designated 46 in FIG. 1 to surface 18 from which it is reflected along a path 48 to the sensor in surface range finder 40 and processed.

The information about indirect reflecting surface 18 contained in the signal provided by the surface range finder 40 includes the presence or absence of surface 18 within a predetermined distance from flash system 10. If the signal indicates the presence of surface 18, control means 42 causes operation of flash illumination sources 14 in both the first and second modes as will be described in detail presently. On the other hand, if surface 18 is not present, this information also contained in the signal causes control means 42 to operate flash illumination sources 14 only in the second or direct flash mode as will be described. In other words, if surface 18 is beyond the maximum distance which will permit effective indirect flash, indirect flash is not employed, and if surface 18 is at or within the maximum distance, indirect flash may be employed.

The information contained in the signal provided by range finder 40 can also include the actual distance to surface 18, i.e. the actual distance indicated 52 in FIG. 1, and this combined with camera-subject ranging data can be utilized to provide automatic adjustment of flash output in conjunction with exposure control parameters set by the camera's microprocessor based control system in dependence on the film type and speed, lens aperture and shutter speed in a manner well known in the art.

The camera 12 also includes an active scene range finder 41 which includes an infrared radiation emitter and sensor that are aimed in the same direction as the camera imaging lens 13 toward scene 20. Such a range finder is disclosed, for example, in FIG. 3 of the above referenced U.S. Pat. No. 4,592,638, incorporated herein by reference. In addition, the camera 12 includes a passive scene range finder 43 mounted on the front of the camera body aimed with the camera lens 13 on the scene 20. In regard to a first aspect of the present invention, the passive scene range finder 43 may take the form of the single spot linear photosensitive element array pair of the type disclosed in FIG. 14 of the above-incorporated '817 patent (but without the augmenting illumination). However, as illustrated and described hereafter in respect to FIG. 2, with respect to a second aspect of the invention, a multi-spot array system of two or more pairs of linear photosensitive element arrays is employed as the passive scene range finder 43. Activation and control signals for the active and passive scene range finders 41 and 43 are provided by an internal microcontroller which develops focus control signals applied to a servo motor drive system 45 for the camera lens 13.

Figure 2:
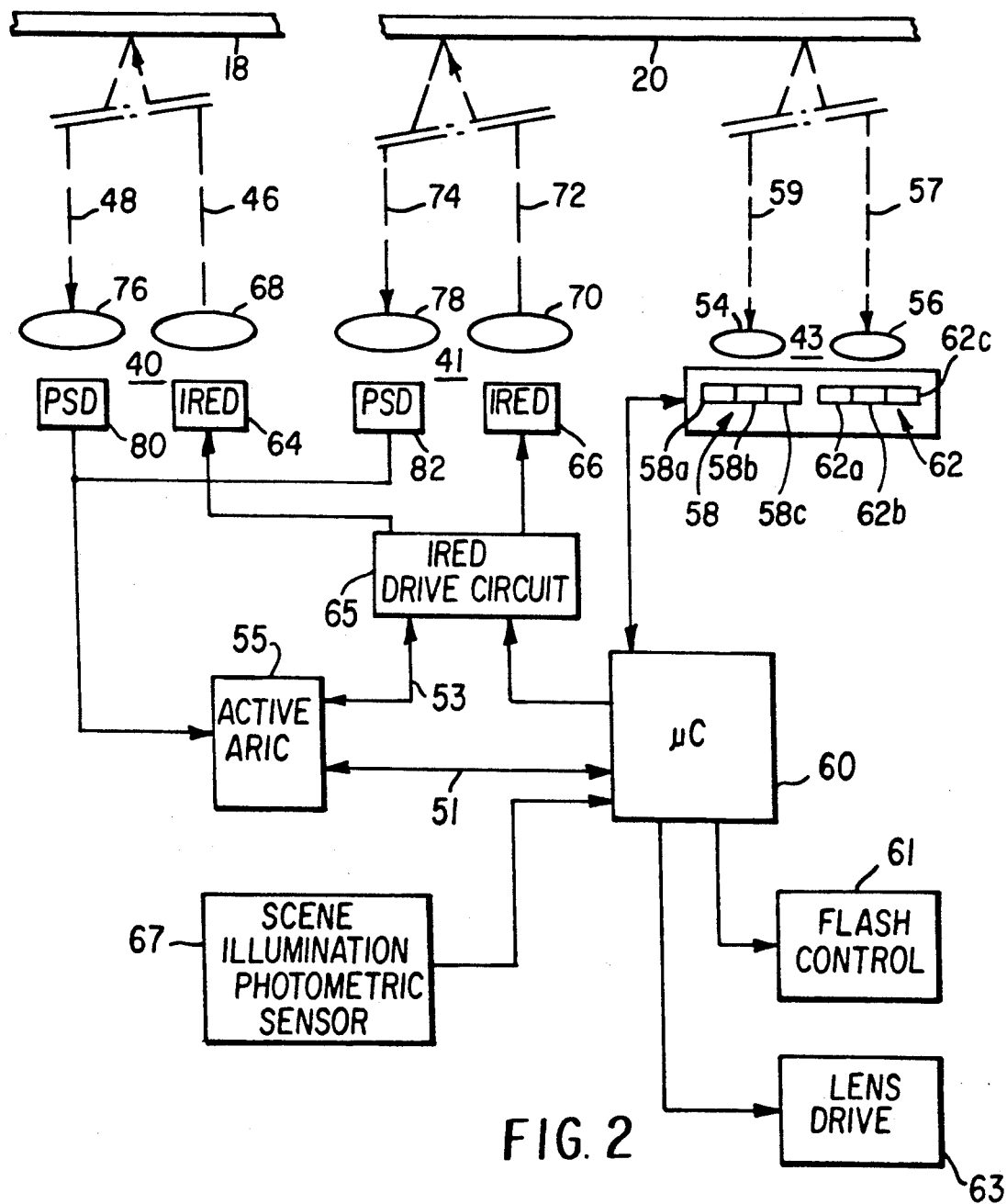
FIG. 2 is a block diagram of the system of FIG. 1 for controlling the selection and reception of active range finding radiation emitters and detectors for AF and ceiling detection in conjunction with passive scene range finding for AF control.

The active and passive scene range finders 41 and 43 for AF control and the active surface range finder 40 are depicted schematically in FIG. 2 along with an infrared (IRED) emitter drive circuit 65, an active auto range finding (AR IC) circuit 55, a scene illumination photometric sensor 67, a flash control electronic system 61, an imaging lens servo motor drive 63, and a microcontroller 60. The microcontroller 60 provides control signals to the indirect and direct flash control circuit 61 and the servo motor drive 63 which adjusts the focus of lens 13.

The microcontroller 60 will be understood to include a microprocessor, read only memories (ROMs), random access memory (RAM), communication ports and input and output latches and buffers all interconnected through address and data buses. The preferred implementation for the camera control 10 is a microprocessor, such as the Motorola 68HC805B6 which has a built-in A/D converter. The camera microcontroller also receives inputs from other camera transducers, such as an autofocus sensor, a camera orientation sensor and a camera-user interface. The user interface may be as simple as a shutter button or may embody additional features such as multiple light metering modes and override command switches. If the camera is a telephoto or zoom model, the taking lens focal length may also be accessed by the microcontroller from the zoom lens and the zoom position indicator.

Microcontroller 60 thus contains interrupt circuits, control and power circuitry and input buffers and latches and the like for responding to these various status and control input signals and others, such as the state of the shutter release button 62, the motor advance mechanism, flash unit specifications, characteristics of the film in the camera, and the like. The output latches and drivers are employed to store temporarily and apply control signals to the shutter release, photoflash, film advance motor drive, imaging lens servo control system for AF, and lens aperture and/or shutter speed control for AE, etc.

Turning to the passive scene range finder 43, it typically includes a pair of focusing lenses 54 and 56 positioned with respect to a pair of spaced apart, linear photosensitive element range sensor array systems 58 and 62 to focus light received along paths 57 and 59 from the scene 20 that the camera imaging lens 13 is pointed at onto the respective linear sensor array system. In SLR camera systems, the focusing lenses 54 and 56 are arranged symmetrically with respect to the optical axis of the camera's imaging lens and light passing through the lens (TTL) is diverted by half silvered mirrors through the pair of focusing lenses and onto the linear arrays. In range finder cameras, the pair of focusing lenses 54 and 56 and the associated linear arrays of photosensitive elements are mounted on the camera a distance away from the imaging lens.

In accordance with an aspect of the present invention, FIG. 2 illustrates the combination of the active single-spot scene range finder 41 with a passive multi-spot scene range finder 43 which is especially suited for use with the camera operating system of the above-incorporated '916 patent. Consequently, each of the linear array systems 58 and 62 preferably comprises the three illustrated linear arrays 58a-58c and 62a-62c which each in turn comprise a plurality, e.g. n, photosensitive elements (where n may or may not be the same number for each array). The arrays 58a-58c and 62a-62c are arranged end-to-end and positioned with respect to the lenses 54 and 56 so that each of the respective pairs of linear arrays 58a, 62a; 58b, 62b; and 58c, 62c receive light from the left, center and right portions of the scene 20.

The photo-electrically converted signals from the n photosensitive elements of each such pair of linear arrays of the passive scene range finder linear array systems 58 and 62 are processed by the microprocessor based AF control algorithm to detect the displacements of the two portions of the scene images focused thereon and to provide a set of control signals that can advantageously be combined or selected among in accordance with the teachings of the above-incorporated '916 patent.

The photocurrent output signals from each photosensitive element in the passive scene range finder sensor arrays 58a-58c and 62a-62c are applied to conventional amplifier and signal processing circuits and are converted from current to voltage signals, amplified, subjected to logarithmic compression and converted from analog to digital signals. These functions can be accomplished with any of a number of conventional operational amplifiers which substantially meet the ideal requirements of infinite input impedance, zero output, zero input bias current, zero input offset voltage, voltage gain of inanity, and high gain-bandwidth product coupled to A/D converters.

As described above, the active surface range finder 40 and active scene range finder 41 each include radiation emitters which may take the form of light emitting diodes 64 and 66, respectively, which are driven by a common IRED drive circuit 65 that is selectively energized by command signals received from microcontroller 60. Pulsated infrared or near infrared light is emitted and focused by the focusing lens elements 68 and 70, respectively, toward the surface 18 and scene 20, respectively, in emitted beams 46 and 72, respectively. The reflected beams 48 and 74, respectively, are focused through light collection lens 76 and 78, respectively, onto position sensitive detectors (PSDS) 80 and 82, respectively, of the type described above in reference to the '638 patent and the '312 patent.

The PSD 80 of the surface range finder 40 and the PSD 82 of the active range finder 41 are coupled to the common active AR IC circuit 55 which is coupled by control and signal fines 51 to microcontroller 60. Commands and data signals are transferred back and forth on the control and signal lines 51 between microcontroller 60 and active AR IC circuit 55 to cause it to selectively process output signals of PSD 80 and PSD 82. A command line 53 extends between the IRED drive circuit 65 and the active AR IC 55 to synchronize emission of the beams 46 and 72 by the IRED light emitting diodes 64 and 66, respectively, with the activation of the active AR IC 55.

By way of example, in an illustrative system, active surface range finder 40, emitter-detector pair 64, 80, and active AR IC 55 when actuated provide signal information relating to the actual distance 52 between indirect reflecting surface 18 and system 10 by a triangulation method. In particular, the IRED emitter LED 64 radiates pulsed infrared rays to surface 18, and the PSD 80 is a position sensitive detector. A right triangle is defined wherein the hypotenuse is the path of beam 48 shown in FIG. 1, the longer of the two legs is the path of beam 46, and the shorter leg is the distance between the center of the IRED emitter LED 64 and the point where light along the path of beam 48 is incident on the PSD 80. The two legs are, of course, at right angles to each other.

As the actual distance 52 between flash system 10 and surface 18 varies, the point of incidence of the reflected infrared beam 48 on the PSD 80 also will vary. The distance 52 between flash system 10 and surface 18 is determined by the relationship $L = 1/x(f)(B)$ where L is the distance from the flash system 10, i.e. from the IRED emitter LF-D 64 to surface 18, B is the distance between the centers of the IRED emitter LED 64 and the PSD 80, f is the focal length of the PSD 80 and its corresponding lens 76, and x is the distance between the point of incidence of the reflected beam 48 on the PSD 80 and the center of the PSD 80. The variable x is a function of the distance 52 between the active surface range finder 40 and surface 18 and is determined in the following manner.

When infrared radiation is incident at a spot on the surface of the position sensitive detector, an electric charge proportional to the light energy is generated at the point of incidence which creates photo currents flowing in opposite direction from that spot. The photo current collected at spaced apart electrodes are inversely proportional to the distances between the spot and the electrodes, and from this the spot or position or location of incidence can be determined. From that, the variable x can be determined. This description is applicable as well to the active scene range finder 41 and the calculation of the distance between it and the scene 20. By way of example, in an illustrative system, the active range finders 40 and 41 is commercially available from Hamamatsu under the commercial designation Range Finder IC which, in the case of the active surface range finder 40, provides an output signal when surface 18 is in the range from about 1 to about 5 feet from flash system 10.

Figure 3:
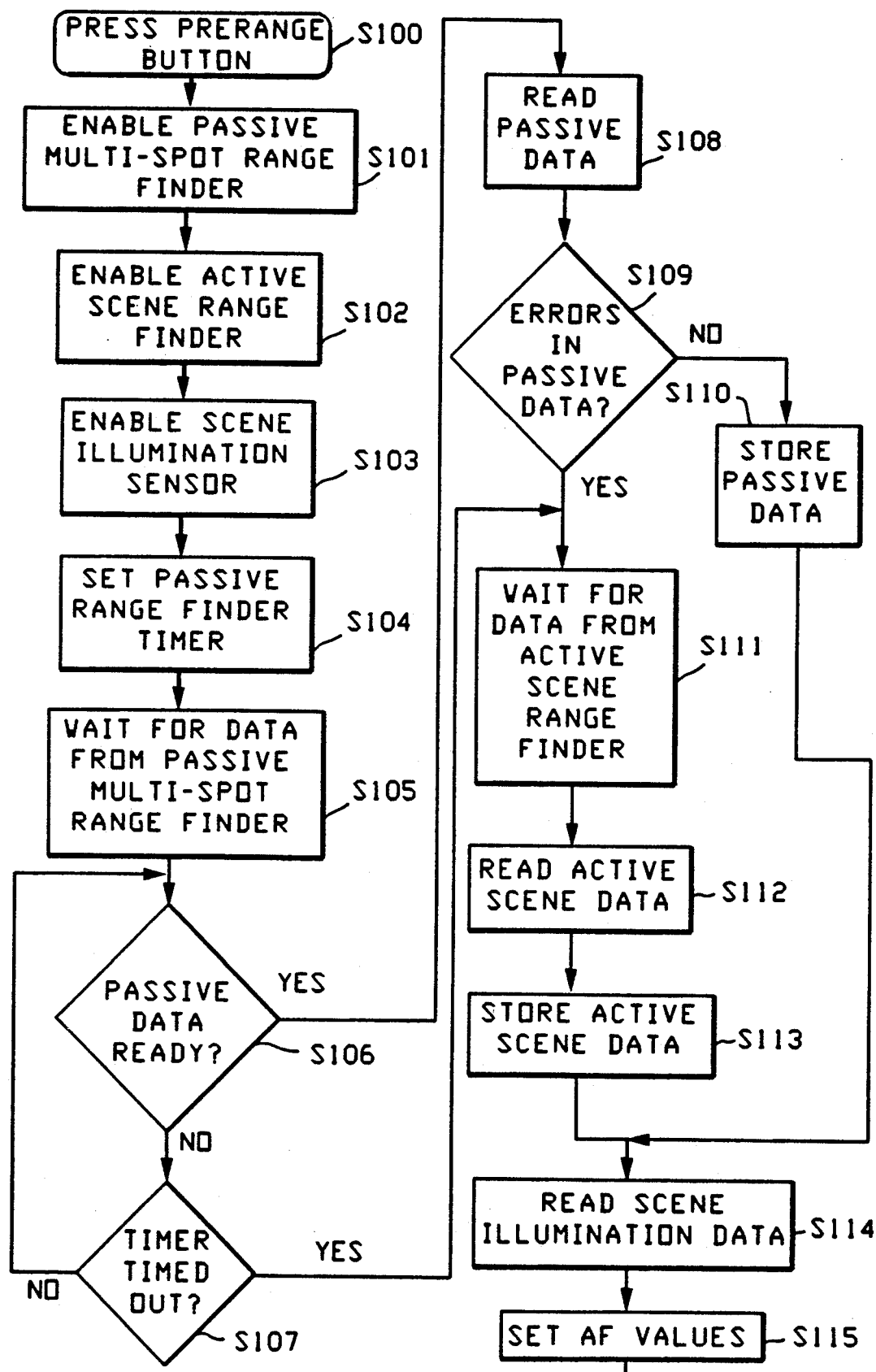
FIGS. 3 and 4 are a flowchart of the operation of the system of FIGS. I and 2.
Figure 4:
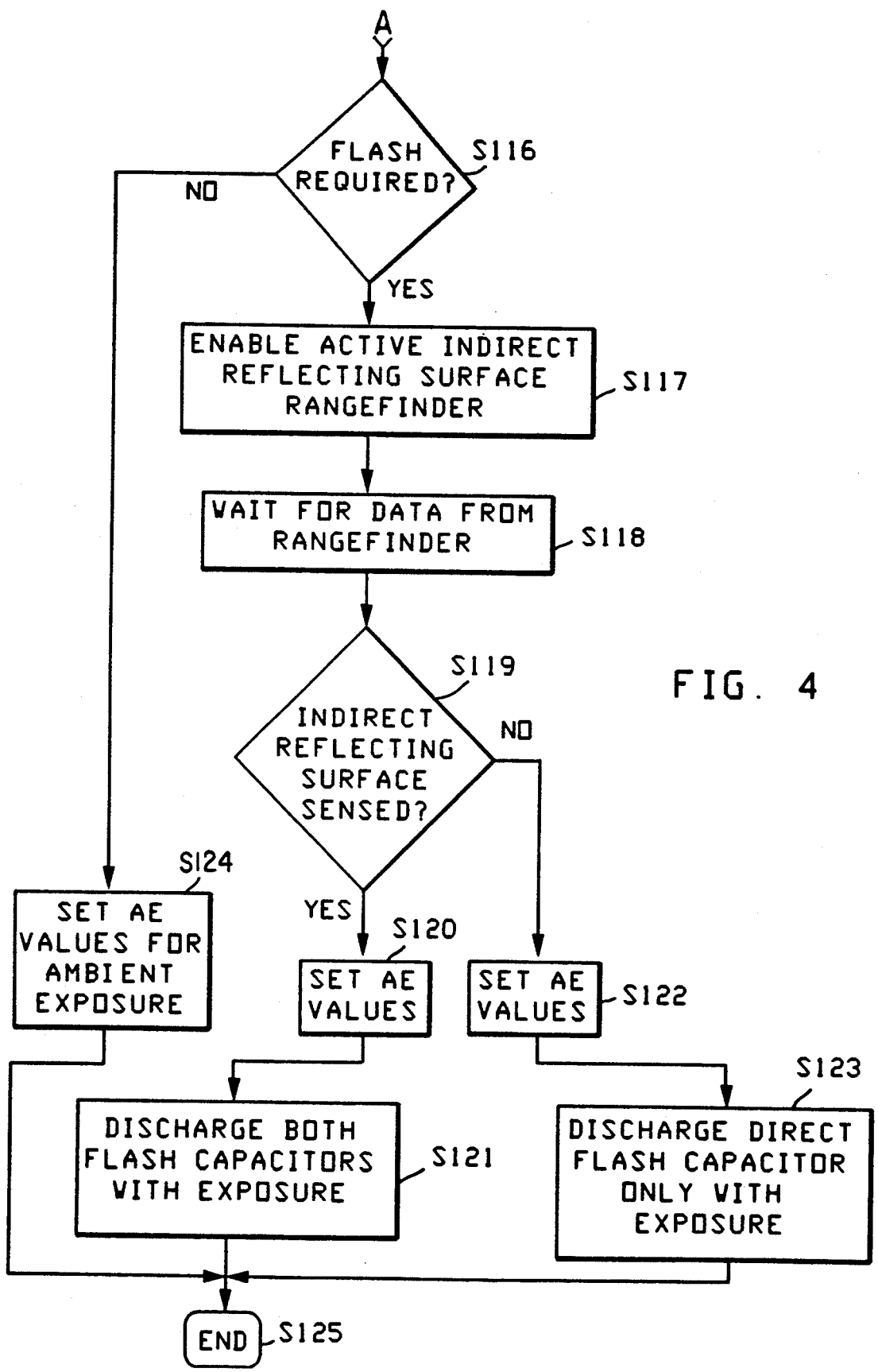

Turn now to FIGS. 3 and 4, they constitute a general flowchart illustrating the operation of the system described above which may be implemented in software and stored in memory within the microcontroller 60. In start block S100, it is assumed that the user has framed a scene in the camera view finder and has pressed downward on the shutter release button. Typically, automatic cameras are provided with a shutter release button which maybe partially depressed until a slight resistance is felt to activate the automatic exposure and focus control systems. In steps S101-S103 the passive multi-spot range finder 43, the active single-spot scene range finder 41 and scene illumination sensor 67 are each enabled by the microprocessor 60. The microprocessor 60 also sets a passive range finder timer of about 50-60 ms. internally in accordance with block S104 and waits for data from the passive multi-spot scene range finder 43 to be received in block S105.

As described above, low scene illumination conditions prolong the accumulation of photocurrent signals by the photosensitive elements of each array in the array system. The integrated photocurrent signals developed by the photosensitive elements are compared to a threshold and the photocurrent signal levels are processed, digitized, latched, and subjected to a correlation and interpolation to develop the left, central and right distance data that is forwarded to the microcontroller 60 in decision block S106 unless the passive range finder timer times out first in block S107.

If the passive multi-spot range finder distance data is ready before the timer times out in decision block S107, the data is read in block S108. The passive scene distance data is analyzed in decision block S109 to determine is the scene is rangeable using the passive multispot range finder. If the processed data exhibits low contrast in one or more of the right, central or left portions of the scene, it is presumed to contain errors. If no errors in the passive data are detected, then the passive data is stored in block S110.

However, if there are errors in the passive data as determined in block S109 or if the passive range finder timer has timed out as determined in decision block S107, then the microcontroller 60 examines the output of the active singlespot scene range finder 41 by sending the appropriate enabling signals to the IRED drive circuit 65 and the active AR IC circuit 55 in blocks S111-S113. It may be necessary to wait for the distance data from the active AR IC circuit 55 to be developed, read in and stored in memory in the microcontroller 60, if it takes longer than about 60 ms.

Thereafter (in the particular sequence illustrated in FIG. 3), the scene illumination data is read from the scene illumination photometric sensor 67 in block S114. The data read in from each of the active single-spot and/or passive multi-spot range finders and the scene illumination photometric sensor may be employed in the algorithms set forth in the above incorporated '916 patent in order to set the AF parameters to adjust the camera imaging lens focal length accordingly in block S115.

Turning now to FIG. 4, it depicts a general flowchart for controlling the discharge of the indirect and/or direct flash illumination capacitors in response to the distance data and the detection of and indirect reflecting surface to the use of the active surface range finder 40 as described above. At decision block S116, the microcontroller determines whether or not flash is required from the scene illumination photometric sensor data read in block S114. If scene illumination is high enough, then flash illumination will not be provided. However, if scene illumination is too low to provide an adequate exposure of the film, then the active indirect reflecting surface range finder 40 is enabled by the microcontroller 60 as described above in block S117. Again it may be necessary to wait for the reflective surface distance data to be processed by the active AR IC circuit 55 in block S118.

If a suitable indirect reflecting surface 18 is detected in decision block S119, then the exposure values are set in block S120 and discharge of both the direct and indirect high voltage flash capacitors through the respective direct and indirect illumination flash tubes may be enabled in block S121. Conversely, if the indirect reflecting surface is not sensed in decision block S119, then further automatic exposure values are set in block S122, and the discharge of only the direct high voltage flash capacitor through the direct illumination flash tube is initiated in block S123. It will be understood that the discharge of the indirect and/or direct flash capacitors through the indirect and/or direct illumination flash tubes takes place upon complete depression of the shutter release button and in synchronization with the opening of the shutter as is well known in the art. The setting of the AE values in blocks S120 and S122 may be done in accordance with the teachings of the above-incorporated '916 patent.

If ambient light conditions are sufficient as determined in decision block S116, the automatic exposure values are set in block S124 in accordance with the output of the photometric sensor and the depth of the scene derived from the primary and secondary distance data developed by the passive multi-spot scene range finder in the manner described in the above-incorporated '916 patent. Thereafter, the flow chart concludes in the end block S125.

By this arrangement, the number of drive and signal processing circuits are decreased in a camera system including indirect artificial illumination and redundant scene range finding for AF. Any of the algorithms for selecting the order of use of the active and passive scene range finders set forth in the above-identified prior art may advantageously be employed instead of that illustrated in FIGS. 3 and 4 in the practice of the invention. Moreover, the active range finder IRED, PSD and active AR IC circuit components may take any form known in the art. Similarly, the passive, multi-spot, scene range finder arrays 58a-58c and 62a-62c may comprise n photodiodes, CCD elements, or other photosensitive elements, with appropriate electronic control and signal processing circuits coupled to each element of each pair of arrays.

Advantageously, in accordance with the first aspect of the invention, the active scene range finder 41 is employed with the shared IRED drive circuit 65 and active AR IC 55, and it is not necessary to augment the illumination of the scene to enhance the operating range of the passive range finder. With respect to the second aspect of the invention, the passive, multi-spot, scene range finder array system, in conjunction with the active, single-spot range finder permits a high degree of flexibility without detracting from the advantages inherent in either and as set forth in the above-incorporated '916 patent.

Although the preferred embodiments have been described in specific reference to a photographic still camera, it will be understood that cine film and videotape cameras employing artificial bounce illumination systems may benefit from incorporation of the invention. The preferred embodiments of the present invention have been described in detail for purposes of illustration and not limitation.

What is claimed is:

1. An automatic focus and indirect illumination control system for focusing a camera imaging lens on a scene and for selectively illuminating the scene with light from a camera associated light source comprising:
   first range finder means, including first electromagnetic radiation emitting means for directing radiation at the scene, and first electromagnetic radiation detecting means for detecting electromagnetic radiation reflected from the scene, for providing a distance related first signal in response thereto;

second range finder means, including second electromagnetic radiation emitting means for directing radiation at a surface generally oblique to the plane of the scene onto which scene illuminating light may be directed, and second electromagnetic radiation detecting means for detecting electromagnetic radiation reflected from said generally oblique surface, for providing a distance related second signal in response thereto;

an auto range finding signal processor common to both said range finder means for selectively processing said first and second distance related signals for deriving first and second perspective range signals in response thereto; and control means operatively coupled to said first and second range finder means and said auto range finding signal processor for selectively energizing said first and second electromagnetic radiation emitting means and selectively coupling said auto range finding signal processor to said first and second detecting means, respectively.

2. The system of claim 1 further comprising:

means for adjusting the focal length of said camera imaging lens with respect to objects of interest in scene;

third range finder means, including third electromagnetic radiation detecting means for detecting natural or artificial electromagnetic radiation reflected from objects of interest in the scene, for providing a third range signal indicative of the distance between the camera imaging lens and such objects in the scene; and wherein said control means further comprises:

means for employing the first or the third distance related range signal for controlling said lens focus adjusting means.

3. The system of claim 2 further comprising:

photosensor means for detecting and providing a scene illumination signal related to the level of illumination of a scene;

means responsive to said scene illumination signal for providing an insufficient scene illumination signal on detection of an insufficiently illuminated scene for capturing an image thereof by the camera imaging lens;

first triggerable scene illumination means for selectively illuminating the scene with light reflected from said surface; and wherein said control means further comprises:

means responsive to said insufficient scene illumination signal for selectively energizing said second radiation emitting means and selectively coupling said auto range finding signal processor to said second radiation detecting means; and means responsive to said second distance related range signal for triggering said first triggerable scene illumination means when the second distance related range signal signifies the presence of a reflecting surface at a distance and having reflecting characteristics suitable for reflecting light onto objects in the scene.

4. The system of claim 3 further comprising:

second triggerable scene illumination means for directly illuminating the scene with light; and wherein said control means further comprises:

means responsive to said second distance related range signal for triggering said second triggerable scene illumination means when the second distance related range signal signifies the absence of a reflecting surface at a distance and having reflecting characteristics suitable for reflecting the illuminating light from said first triggerable scene illumination means onto objects in the scene.

5. The system of claim 2 further comprising:

photosensor means for detecting and providing a scene illumination signal related to the level of illumination of a scene;

means responsive to said scene illumination signal for providing an insufficient scene illumination signal on detection of an insufficiently illuminated scene for capturing an image thereof by the camera imaging lens;

first triggerable scene illumination means for selectively illuminating the scene with light reflected from said surface;

second triggerable scene illumination means for directly illuminating the scene with light; and wherein said control means further comprises:

means responsive to said insufficient scene illumination signal for selectively energizing said second radiation emitting means and selectively coupling said auto range finding signal processor to said second radiation detecting means;

means responsive to said second distance related range signal for triggering said first and said second triggerable scene illumination means when the second distance related range signal signifies the presence of a reflecting surface at a distance and having reflecting characteristics suitable for reflecting the illuminating light onto objects in the scene; and means responsive to said second distance related range signal for triggering said second triggerable scene illumination means when the second distance related range signal signifies the absence of a reflecting surface at a distance and having reflecting characteristics suitable for reflecting the illuminating light from said first triggerable scene illumination means onto objects in the scene.

6. The system of claim 5 wherein an automatic focus adjusting system for a camera is provided and further comprising:

passive range finder means comprising at least a first pair of linear photosensitive element arrays each comprising a first plurality of photosensitive elements and a pair of focusing lens elements for focusing a central portion of the scene onto the photosensitive elements of the first pair of arrays and a second pair of linear photosensitive element arrays each comprising a second plurality of photosensitive elements positioned with respect to said pair of lens elements and said first plurality of photosensitive elements so that said lens elements focus a peripheral portion of the scene onto the photosensitive elements of the second pair of arrays; and range finder selection means for selectively operating said active range finder means under first scene illumination conditions and said passive range finder means under second scene illumination conditions.

7. The system of claim 2 wherein said third range finder means further comprises:

passive range finder means comprising at least a first pair of linear photosensitive element arrays each comprising a first plurality of photosensitive elements and a pair of focusing lens elements for focusing a central portion of the scene onto the photosensitive elements of the first pair of arrays and a second pair of linear photosensitive element arrays each comprising a second plurality of photosensitive elements positioned with respect to said pair of lens elements and said first plurality of photosensitive elements so that said lens elements focus a peripheral portion of the scene onto the photosensitive elements of the second pair of arrays; and wherein said control means further comprises:

range finder selection means for selectively operating said active range finder means under first scene illumination conditions and said passive range finder means under second scene illumination conditions.

8. The system of claim 1 wherein an automatic focus adjusting system for a camera is provided and further comprising:

passive range finder means comprising at least a first pair of linear photosensitive element arrays each comprising a first plurality of photosensitive elements and a pair of focusing lens elements for focusing a central portion of the scene onto the photosensitive elements of the first pair of arrays and a second pair of linear photosensitive element arrays each comprising a second plurality of photosensitive elements positioned with respect to said pair of lens elements and said first plurality of photosensitive elements so that said lens elements focus a peripheral portion of the scene onto the photosensitive elements of the second pair of arrays; and range finder selection means for selectively operating said active range finder means under first scene illumination conditions and said passive range finder means under second scene illumination conditions.

9. In a camera, range finding and automatic focus control apparatus for a camera imaging lens comprising:

active scene range finder means, including first electromagnetic radiation emitting means for directing radiation at a scene, and first electromagnetic radiation detecting means for detecting electromagnetic radiation reflected from the scene, for providing a first signal related to the distance between said camera imaging lens and a subject in the scene;

passive multi-spot range finder means comprising at least a first pair of linear photosensitive element arrays each comprising a first plurality of photosensitive elements and a pair of focusing lens elements for focusing a central portion of the scene onto the photosensitive elements of the first pair of arrays and a second pair of linear photosensitive element arrays each comprising a second plurality of photosensitive elements positioned with respect to said pair of lens elements and said first plurality of photosensitive elements so that said lens elements focus a peripheral portion of the scene onto the photosensitive elements of the second pair of arrays; and range finder selection means for selectively operating said active range finder means under first scene illumination conditions and said passive range finder means under second scene illumination conditions.

10. The camera of claim 9 further comprising:

active surface range finder means, including second electromagnetic radiation emitting means for directing radiation at a surface generally oblique to the plane of the scene onto which scene illuminating light may to be directed, and second electromagnetic radiation detecting means for detecting electromagnetic radiation reflected from said generally oblique surface, for providing a second signal related to the distance between the camera associated light source and said surface and the radiation reflecting characteristics of said surface;

signal processing means for selectively processing said first and second distance signals for deriving first and second respective distance related range signals in response thereto; and control means operatively coupled to said first and second range finder means and said signal processing means for selectively energizing said first and second electromagnetic radiation emitting means and selectively coupling said signal processing means to said first and second detecting means, respectively.

11. In a camera, a method of operating an active single-spot range finder and a passive multi-spot for combined scene range finder and auto focus control of a camera imaging lens comprising the steps of:

enabling said active scene range finder means, including a first electromagnetic radiation emitting means for directing radiation at a scene, and first electromagnetic radiation detecting means for detecting electromagnetic radiation reflected from the scene, for providing a first central scene range signal related to the distance between said camera imaging lens and a subject in the scene;

enabling said passive multi-spot range finder means comprising at least a first pair of linear photosensitive element arrays each comprising a first plurality of photosensitive elements and a pair of focusing lens elements for focusing a central portion of the scene onto the photosensitive elements of the first pair of arrays to provide a second central scene range signal and a second pair of linear photosensitive element arrays each comprising a second plurality of photosensitive elements positioned with respect to said pair of lens elements and said first plurality of photosensitive elements so that said lens elements focus a peripheral portion of the scene onto the photosensitive elements of the second pair of arrays to provide a peripheral scene range signal;

detecting errors in the second central or the peripheral scene range signals; and selectively employing said first central scene range signals upon detection of an error for setting the automatic focus of the camera lens.

12. The method of claim 11 further comprising the steps of:

detecting the ambient illumination of the scene;

determining the need for artificial scene illumination from the detected ambient scene illumination;

enabling an active indirect reflecting surface range finder means, including second electromagnetic radiation emitting means for directing radiation at a surface generally oblique to the plane of the scene onto which scene illuminating light may to be directed, and second electromagnetic radiation detecting means for detecting electromagnetic radiation reflected from said generally oblique surface, for providing a second signal related to the distance between the camera and said surface and the radiation reflecting characteristics of said surface upon detection of the need for artificial scene illumination;

determining the presence of a suitable reflective surface for indirect illumination of the scene from the second distance related signal; and directing artificial illumination upon said surface determined to be present for reflection upon the scene.

13. The method of claim 12 further comprising the step of:

directing artificial illumination directly upon the scene when a suitable reflective surface is determined to not be present.

* * * * *